(12) United States Patent
Shapiro

(10) Patent No.: US 7,406,774 B2
(45) Date of Patent: Aug. 5, 2008

(54) ANGLE MEASUREMENT TOOL

(76) Inventor: Marc Lev Shapiro, 1931 Martha's Rd., Alexandria, VA (US) 22307

( * ) Notice: Subject to any disclaimer, the term of this patent is extended or adjusted under 35 U.S.C. 154(b) by 131 days.

(21) Appl. No.: 11/291,954

(22) Filed: Dec. 2, 2005

(65) Prior Publication Data

US 2006/0179996 A1    Aug. 17, 2006

Related U.S. Application Data

(60) Provisional application No. 60/652,749, filed on Feb. 15, 2005.

(51) Int. Cl.
*B43L 7/10*  (2006.01)
(52) U.S. Cl. .......................................... 33/471; 33/534
(58) Field of Classification Search ................... 33/471, 33/1 N, 452, 465, 534, 538, 276, 578, 451, 33/194, DIG. 21
See application file for complete search history.

(56) References Cited

U.S. PATENT DOCUMENTS

| | | | | |
|---|---|---|---|---|
| 597,464 A * | 1/1898 | Girton | ........................ | 33/460 |
| 832,483 A * | 10/1906 | Johnson | ........................ | 33/471 |
| 1,585,563 A * | 5/1926 | Schlattau | ...................... | 33/471 |
| 1,857,129 A * | 5/1932 | Ahola | ........................ | 33/465 |
| 1,878,119 A * | 9/1932 | Dowd | ........................ | 33/471 |
| 4,394,801 A * | 7/1983 | Thibodeaux | ................. | 33/496 |
| 5,020,233 A * | 6/1991 | Syken | ........................ | 33/465 |
| 5,117,560 A * | 6/1992 | Nevins | ........................ | 33/471 |
| 5,392,525 A * | 2/1995 | Chow | ........................ | 33/465 |
| 5,493,786 A * | 2/1996 | Thomson | ...................... | 33/1 G |
| 5,713,135 A * | 2/1998 | Acopulos | ...................... | 33/451 |
| 5,983,510 A * | 11/1999 | Wu et al. | ....................... | 33/227 |
| 6,167,630 B1 * | 1/2001 | Webb | ........................ | 33/354 |
| 6,195,902 B1 * | 3/2001 | Jan et al. | ....................... | 33/286 |
| 6,237,238 B1 * | 5/2001 | Shapiro | ....................... | 33/471 |
| 6,260,283 B1 * | 7/2001 | Abernathy et al. | ............ | 33/419 |
| 6,796,046 B1 * | 9/2004 | May | ........................... | 33/404 |
| 6,804,895 B2 * | 10/2004 | Shapiro | ....................... | 33/471 |
| 7,047,655 B2 * | 5/2006 | Larsson | ....................... | 33/471 |
| 2003/0051358 A1 * | 3/2003 | Kruse | ........................ | 33/471 |
| 2006/0174503 A1 * | 8/2006 | Johnson | ........................ | 33/471 |

* cited by examiner

*Primary Examiner*—Christopher W Fulton
(74) *Attorney, Agent, or Firm*—Herman Hohauser

(57) ABSTRACT

An angle measurement tool in which the assembled components result in only two moving parts that are pivoted relative to each other and wherein the pivot axis is the geographic center of the angle measurement component and wherein a miter joint angle, the correspondent actual angle, the complementary angle of the actual angle and the supplementary angle of the actual angle can be read simultaneously.

5 Claims, 13 Drawing Sheets

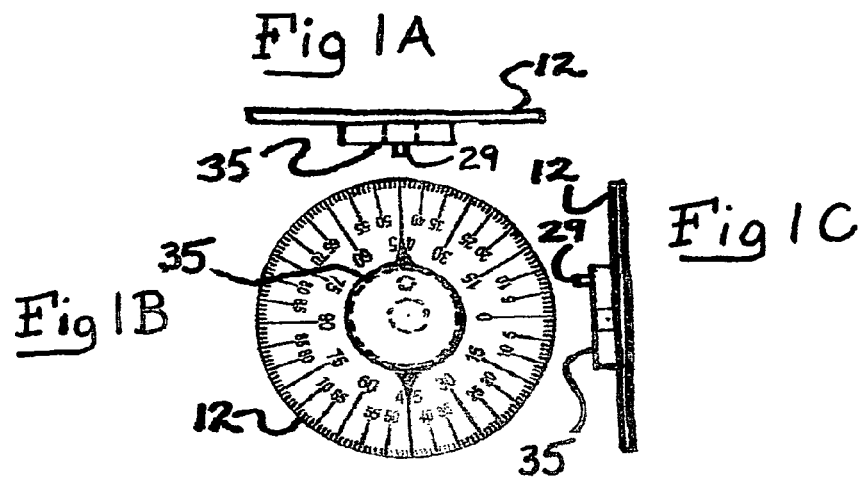
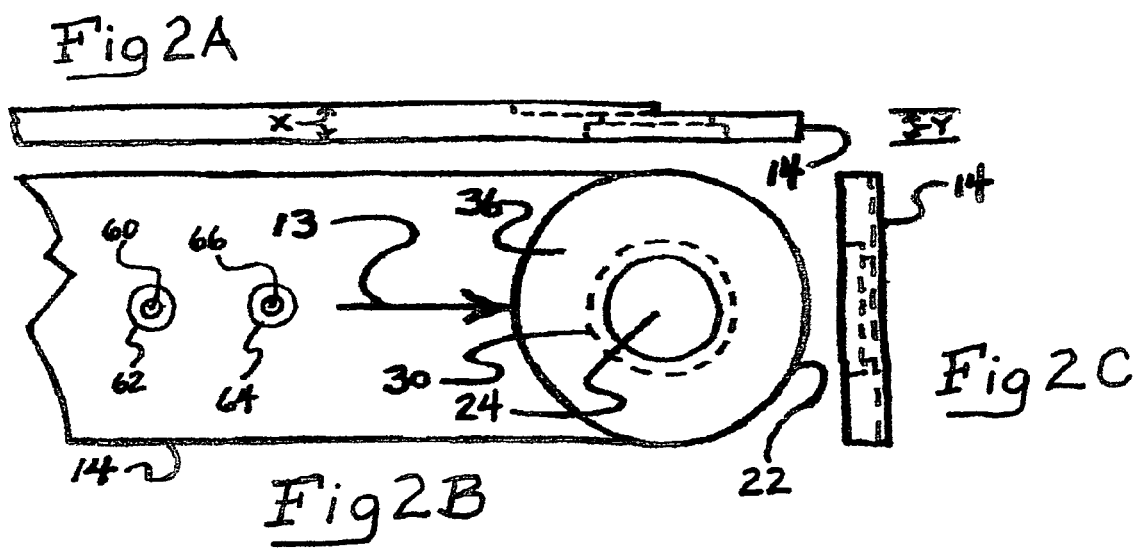
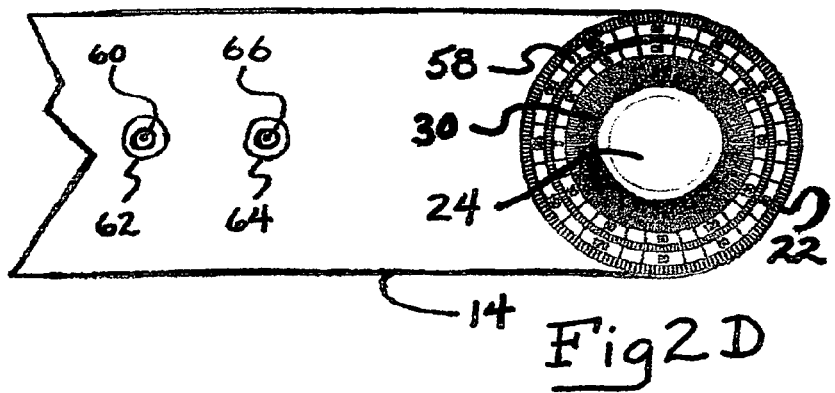

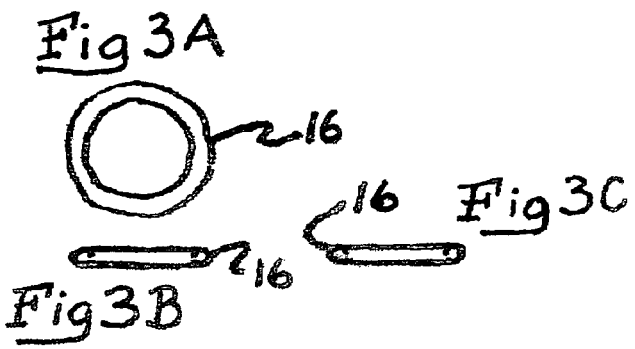
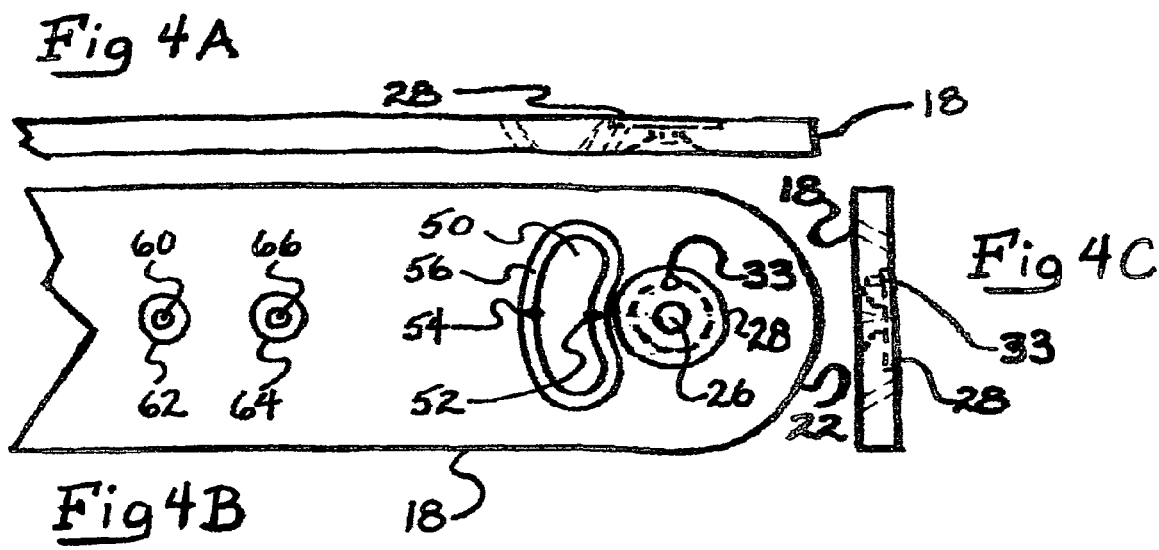
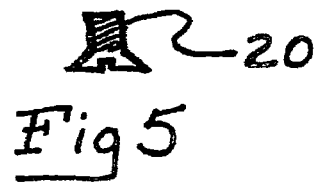
Fig 5

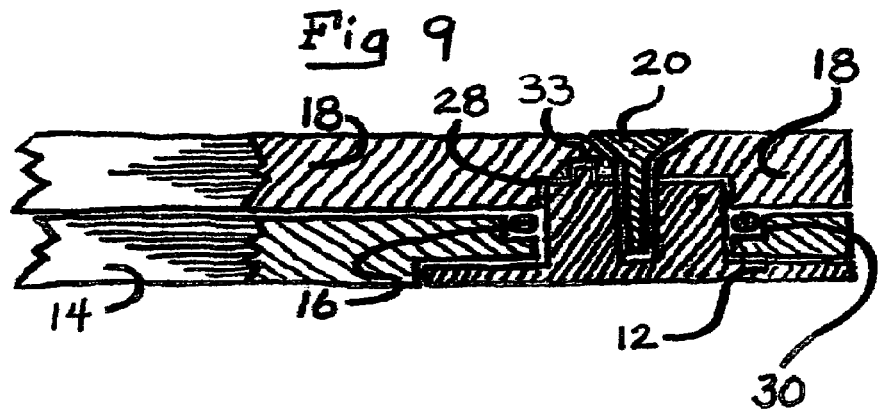
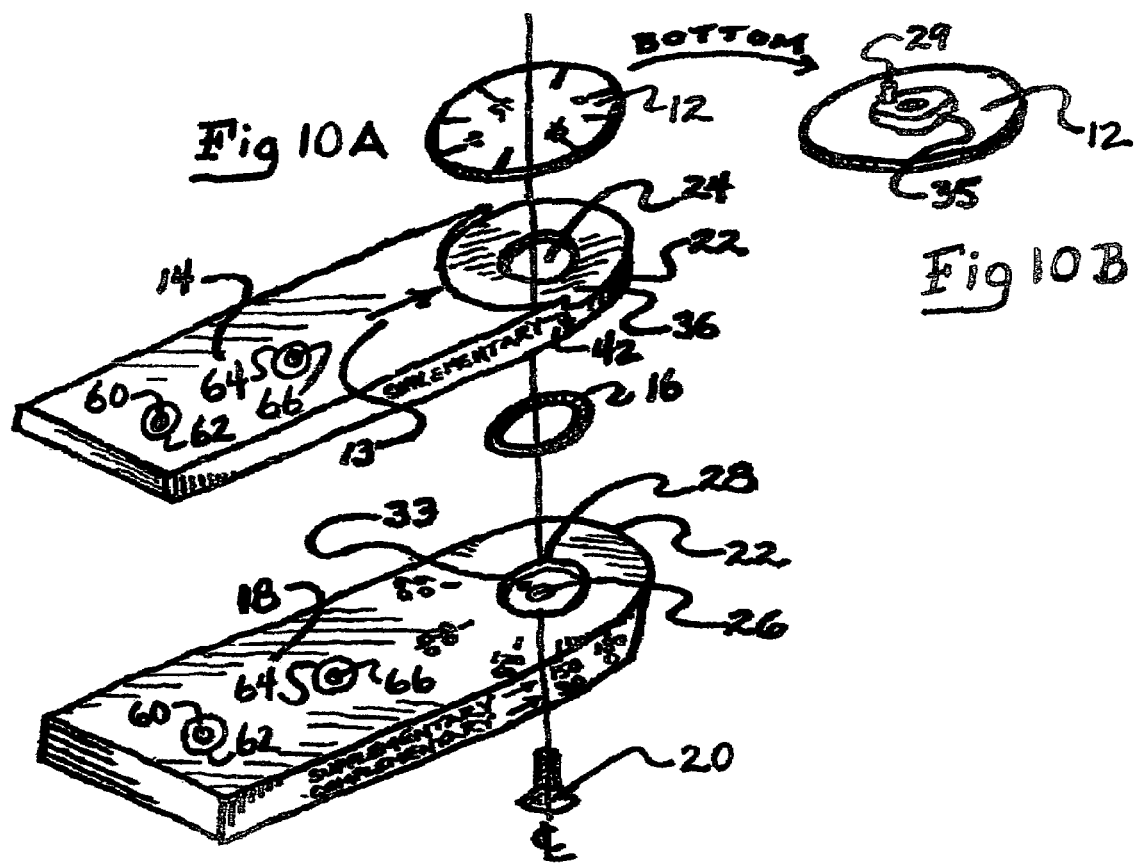

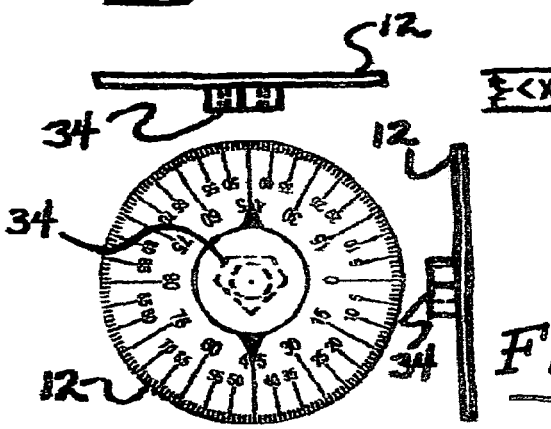
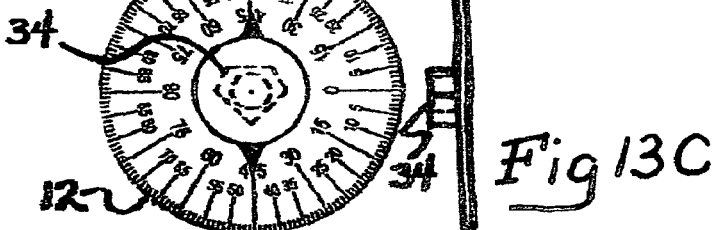
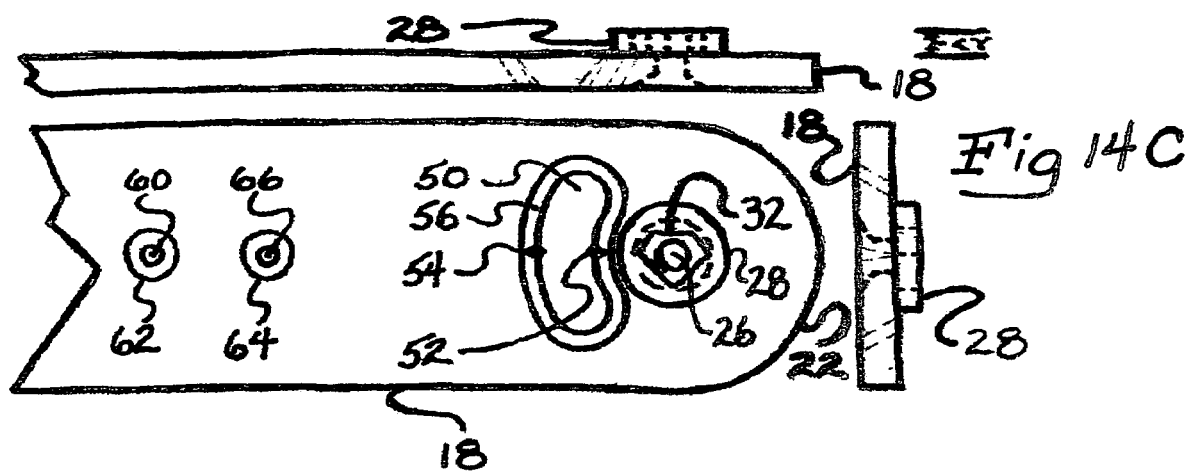

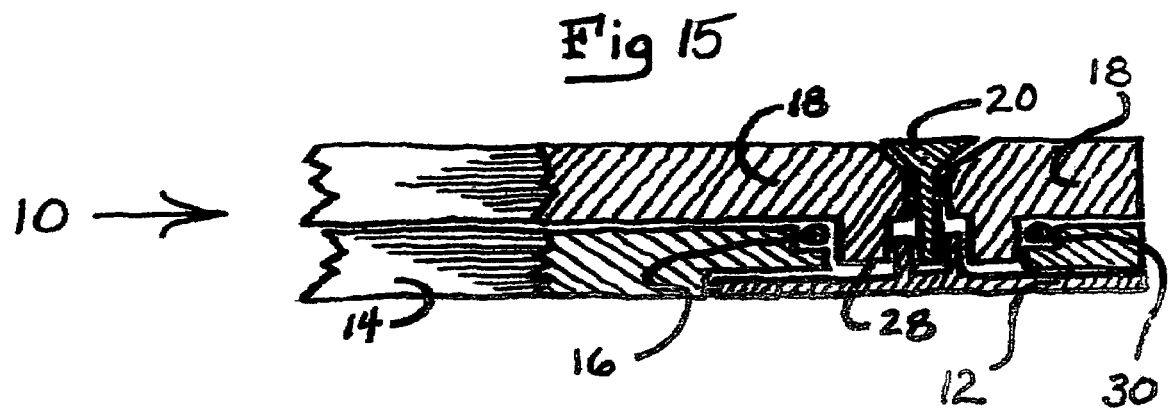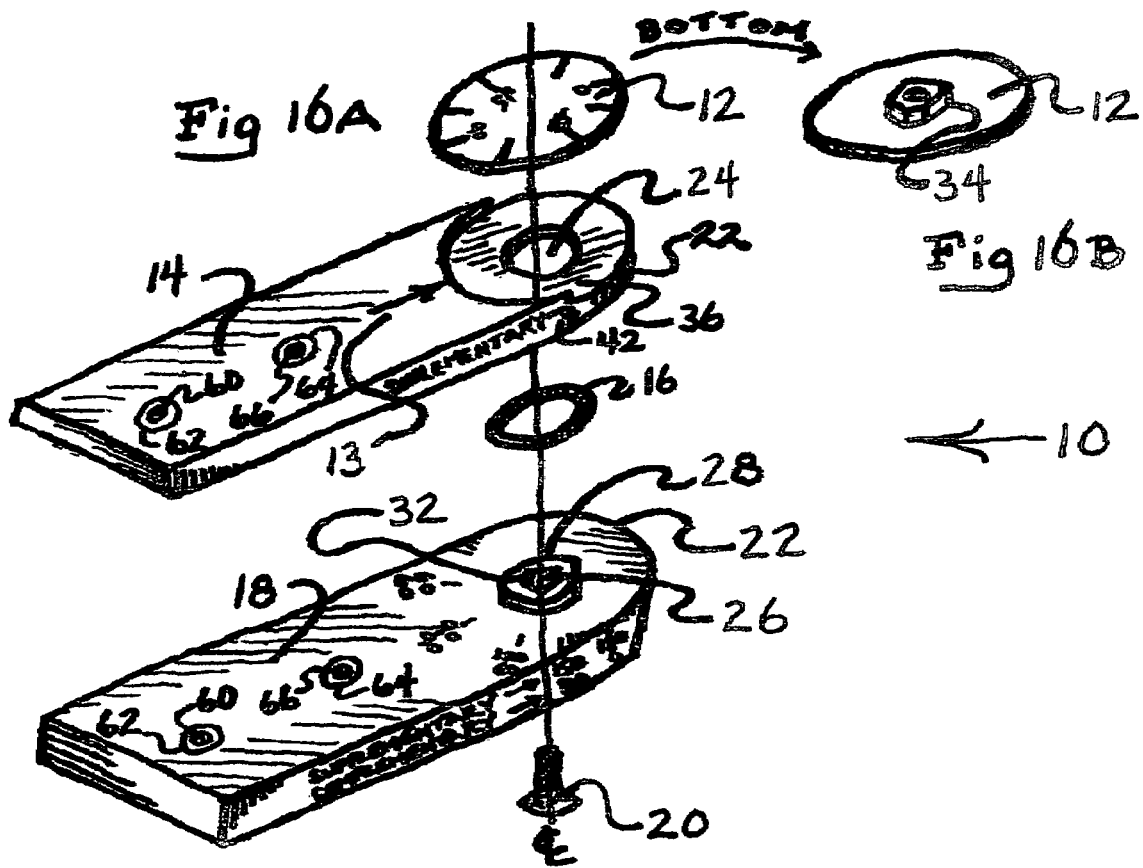

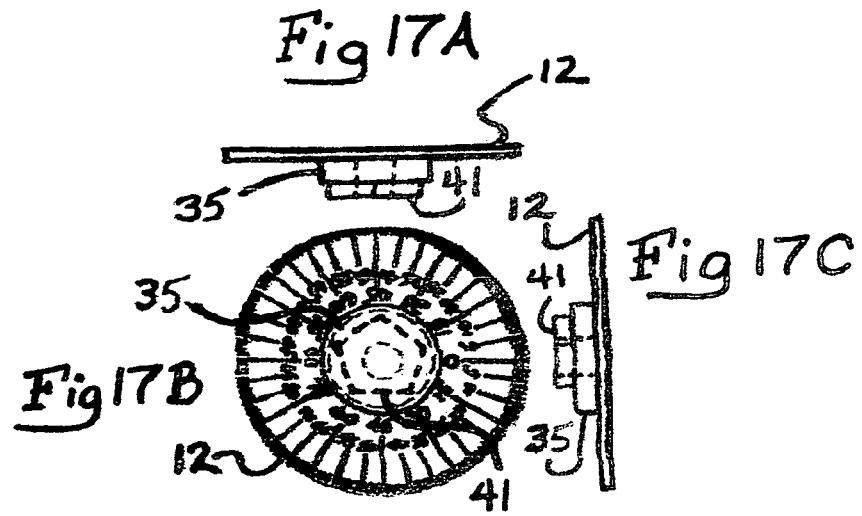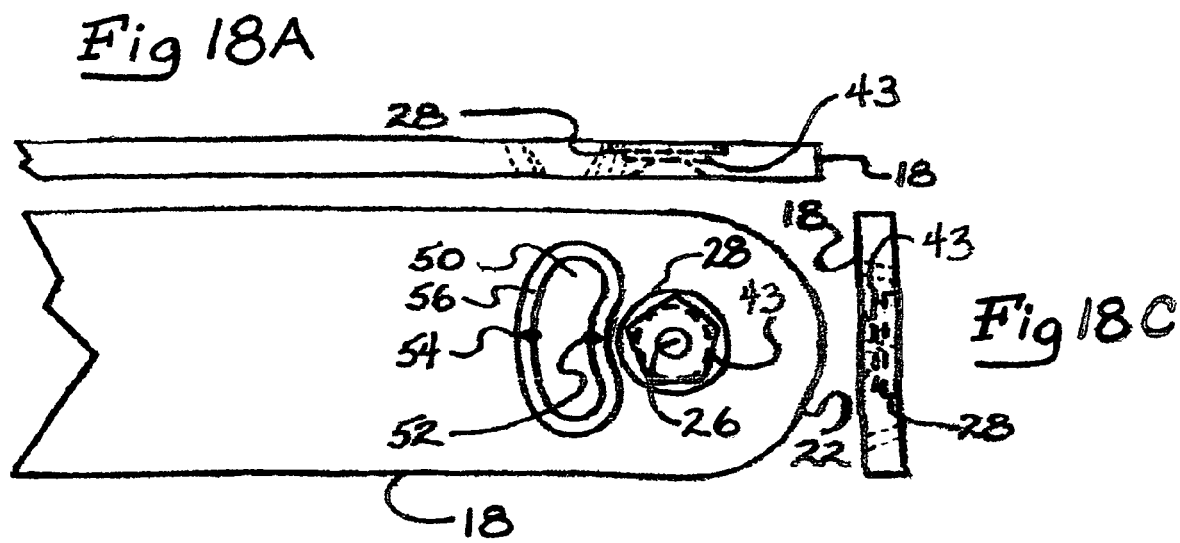

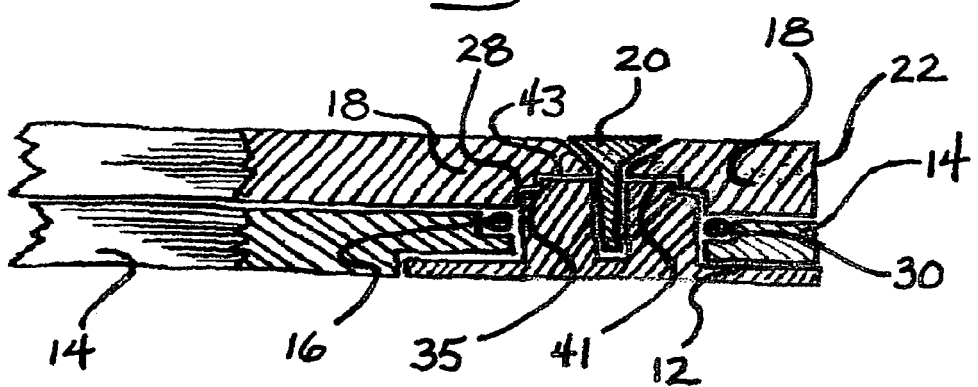
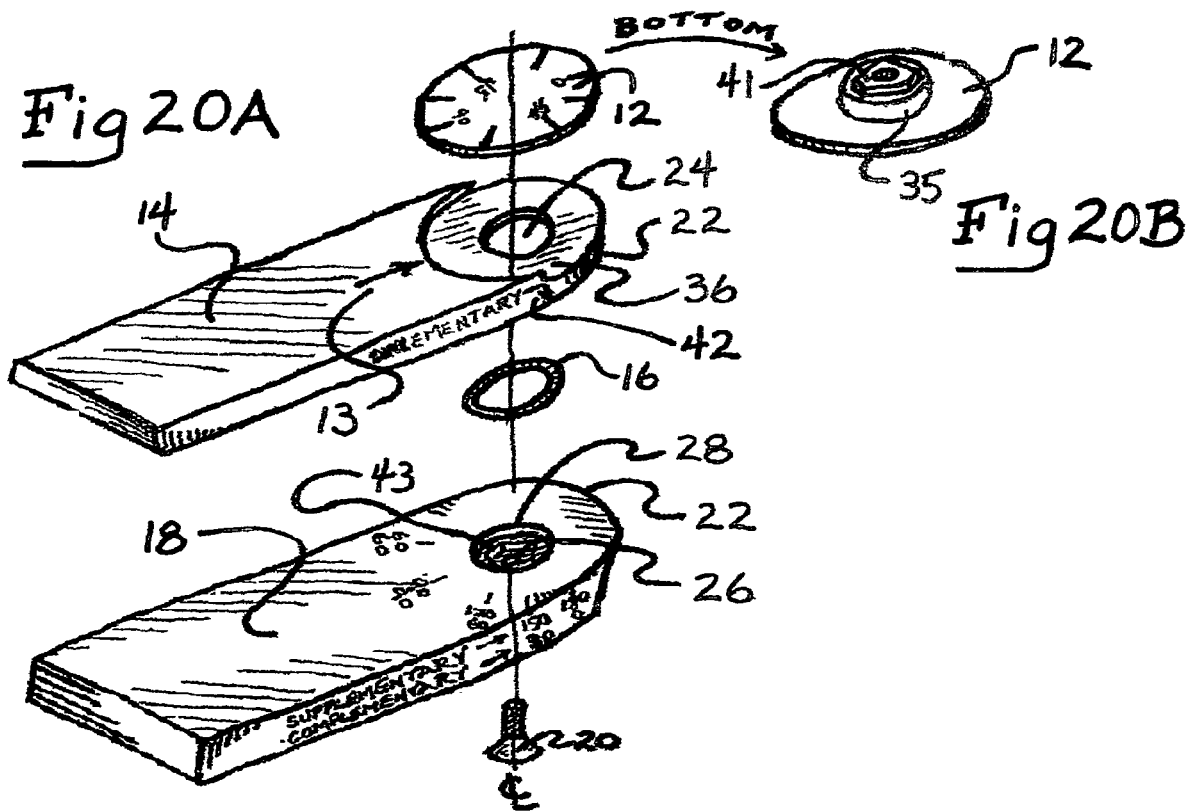

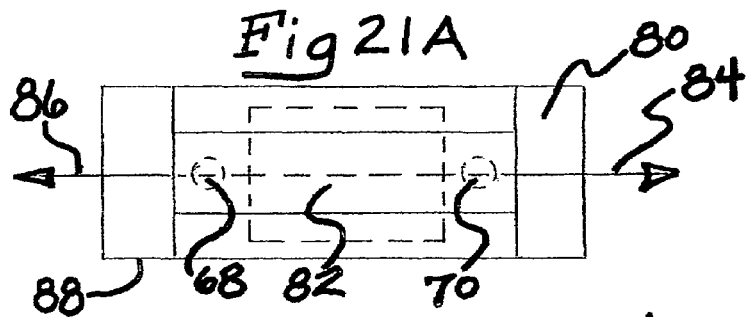
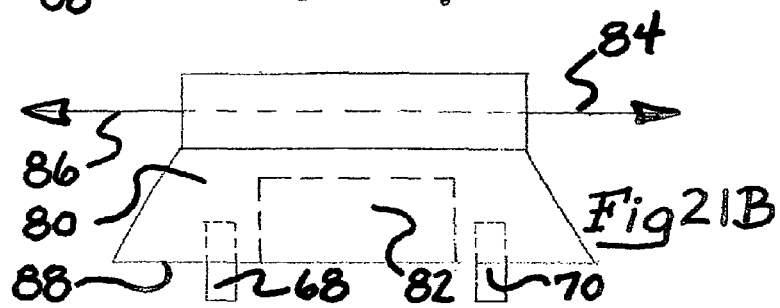
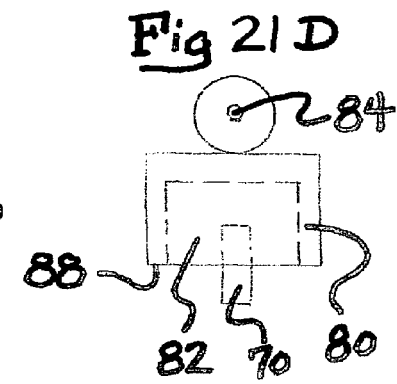
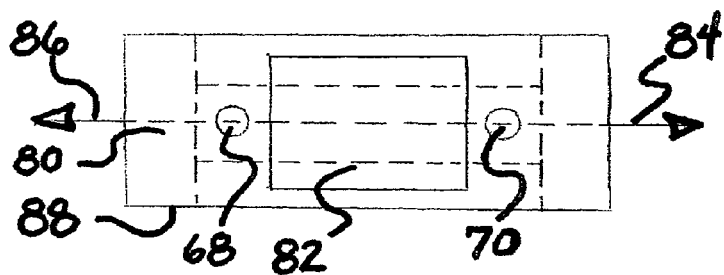
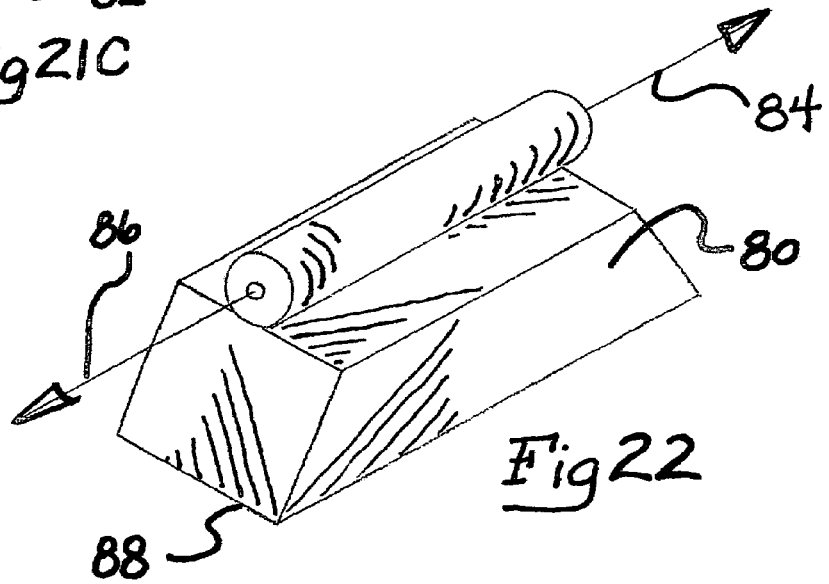

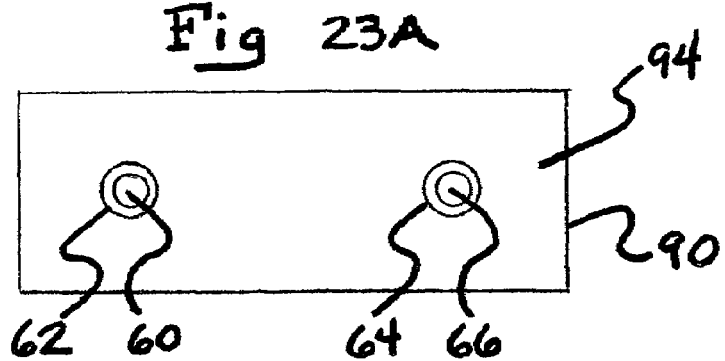
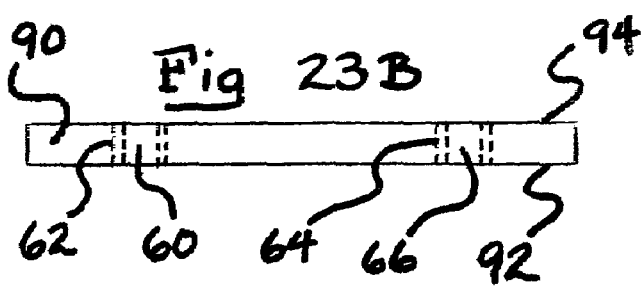
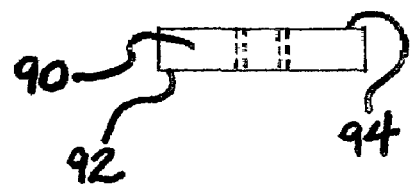
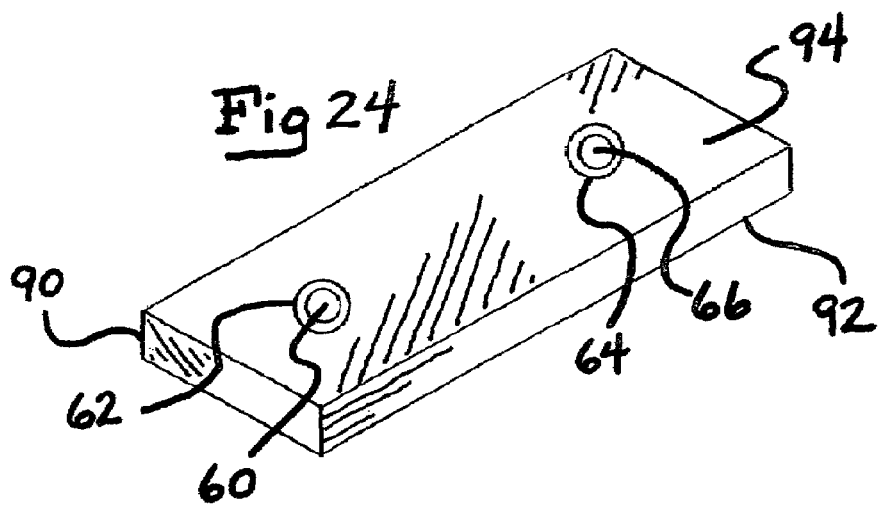

Fig 25

COMPOUND CUT CONVERSIONS
For The 2 Standard Crown Moulds used for cutting crown as it lays flat
Read the RED "Miter Cut" Scale on the dial. Convert that reading here.
Setting The "MITER" Angle:
Set this angle on the saw base.
Setting The "BEVEL" Angle:
"Tilt" the saw blade to this angle.

| "MITER CUT" | 52°/38° CROWN | | 45°/45° CROWN | |
|---|---|---|---|---|
| | MITER | BEVEL | MITER | BEVEL |
| 1 | 0.6 | 0.8 | 0.7 | 0.7 |
| 2 | 1.2 | 1.6 | 1.4 | 1.4 |
| 3 | 1.9 | 2.4 | 2.1 | 2.1 |
| 4 | 2.5 | 3.2 | 2.8 | 2.8 |
| 5 | 3.1 | 3.9 | 3.5 | 3.5 |
| 6 | 3.7 | 4.7 | 4.3 | 4.2 |
| 7 | 4.3 | 5.5 | 5.0 | 4.9 |
| 8 | 5.0 | 6.3 | 5.7 | 5.7 |
| 9 | 5.6 | 7.1 | 6.4 | 6.4 |
| 10 | 6.2 | 7.9 | 7.1 | 7.1 |
| 11 | 6.8 | 8.7 | 7.8 | 7.8 |
| 12 | 7.5 | 9.4 | 8.6 | 8.5 |
| 13 | 8.1 | 10.2 | 9.3 | 9.2 |
| 14 | 8.7 | 11.0 | 10.0 | 9.9 |
| 15 | 9.4 | 11.8 | 10.7 | 10.6 |
| 16 | 10.0 | 12.5 | 11.5 | 11.2 |
| 17 | 10.7 | 13.3 | 12.2 | 11.9 |
| 18 | 11.3 | 14.1 | 12.9 | 12.6 |
| 19 | 12.0 | 14.9 | 13.7 | 13.3 |
| 20 | 12.6 | 15.6 | 14.4 | 14.0 |
| 21 | 13.3 | 16.4 | 15.2 | 14.7 |
| 22 | 14.0 | 17.2 | 15.9 | 15.4 |
| 23 | 14.7 | 17.9 | 16.7 | 16.0 |
| 24 | 15.3 | 18.7 | 17.5 | 16.7 |
| 25 | 16.0 | 19.5 | 18.3 | 17.4 |
| 26 | 16.7 | 20.2 | 19.0 | 18.1 |
| 27 | 17.4 | 21.0 | 19.8 | 18.7 |
| 28 | 18.1 | 21.7 | 20.6 | 19.4 |
| 29 | 18.8 | 22.5 | 21.4 | 20.1 |
| 30 | 19.6 | 23.2 | 22.2 | 20.7 |
| 31 | 20.3 | 23.9 | 23.0 | 21.4 |
| 32 | 21.0 | 24.7 | 23.8 | 22.0 |
| 33 | 21.8 | 25.4 | 24.7 | 22.7 |
| 34 | 22.6 | 26.2 | 25.5 | 23.3 |
| 35 | 23.3 | 26.9 | 26.3 | 23.9 |
| 36 | 24.1 | 27.6 | 27.2 | 24.6 |
| 37 | 24.9 | 28.3 | 28.1 | 25.2 |
| 38 | 25.7 | 29.0 | 28.9 | 25.8 |
| 39 | 26.5 | 29.7 | 29.8 | 26.4 |
| 40 | 27.3 | 30.4 | 30.7 | 27.0 |
| 41 | 28.2 | 31.1 | 31.6 | 27.6 |
| 42 | 29.0 | 31.8 | 32.5 | 28.2 |
| 43 | 29.9 | 32.5 | 33.4 | 28.8 |
| 44 | 30.7 | 33.2 | 34.3 | 29.4 |
| 45 | 31.6 | 33.9 | 35.3 | 30.0 |
| 46 | 32.5 | 34.5 | 36.2 | 30.6 |
| 47 | 33.4 | 35.2 | 37.2 | 31.1 |
| 48 | 34.4 | 35.9 | 38.1 | 31.7 |
| 49 | 35.3 | 36.5 | 39.1 | 32.3 |
| 50 | 36.3 | 37.1 | 40.1 | 32.8 |
| 51 | 37.2 | 37.8 | 41.1 | 33.3 |
| 52 | 38.2 | 38.4 | 42.2 | 33.9 |
| 53 | 39.3 | 39.0 | 43.2 | 34.4 |
| 54 | 40.3 | 39.6 | 44.2 | 34.9 |
| 55 | 41.3 | 40.2 | 45.3 | 35.4 |
| 56 | 42.4 | 40.8 | 46.4 | 35.9 |
| 57 | 43.5 | 41.4 | 47.4 | 36.4 |
| 58 | 44.6 | 41.9 | 48.5 | 36.8 |
| 59 | 45.7 | 42.5 | 49.6 | 37.3 |
| 60 | 46.8 | 43.0 | 50.8 | 37.8 |

ANGLE MEASUREMENT TOOL

CROSS REFERENCE TO RELATED APPLICATION

This application is a conversion of Provisional Application Ser. No. 60/652,749 filed Feb. 15, 2005.

BACKGROUND OF THE INVENTION

This invention is an improvement of the measuring tool described in U.S. Pat. No. 6,237,238 issued May 29, 2001 and U.S. Pat. No. 6,804,895 issued Oct. 19, 2004. This invention is for use in the construction profession with particular applicability to finish carpentry, framing carpentry, wall layout, drywall installation, fitting countertops, piping layouts, floor and ceiling installations and cabinetry. It also has direct applications in the graphic arts field, the engineering and drafting fields and other manufacturing situations where angle measurements are performed. This invention has direct applications in virtually every situation requiring an angle measurement, and it has a multitude of professional and household applications, providing precise angle readings for any carpentry project and any other project that requires angle measurement, angle copying, angle transferring, and/or angle projection with a laser.

This invention is used in the fitting of trim and decorative pieces, or any material, to the surface of wall surfaces, or any surfaces, which meet at an angular junction. This angular junction is commonly referred to as a miter joint. A miter saw/miter box is used to cut the trim and decorative pieces, or any material, in a precise manner so that a clean and accurate miter joint is established.

The invention is also used for fitting single pieces of trim, or any material, into any angle that is encountered. A miter saw/miter box is used to cut the material in a precise manner so that a clean and accurate fit is established between the freshly cut piece and the work surface(s).

In addition to the above-mentioned functions, which are specific to the angle scale that is virtually universal to the miter saw/miter box, this invention also has scales for determining the actual angle, or any interpretation of the actual angle, throughout an entire revolution (zero degrees through 360 degrees).

This invention has additional scales for determining, transferring and laying out the angles for common roof pitches. In the preferred embodiment, these scales are laid out in the standard "inches of rise per lineal foot." The indicated roof pitch is simultaneously converted to a miter saw/miter box setting.

While a miter saw/miter box is the preferred and generally most accurate way to achieve the angled cuts determined by the invention, other means such as a hand saw, hand-held circular saw, radial arm saw, table saw, jig saw and any other means for achieving the determined cuts are contemplated by the inventor.

This invention has a laser accessory and provision is made for said laser accessory to be attached to the invention. The union of this invention with the laser accessory provides a means for projecting any angle setting from a chosen point of origin along the angle chosen and out to a distance limited only by the power of the laser. Such a laser projection is useful in the layout of walls and construction angles, regardless of what plane they are in. Such a laser projection is also useful in the electrical, plumbing, drywall and landscaping fields, as well as any trade or endeavor that requires the accurate determination, and/or projection, of any angle. It should be understood that a laser, or lasers, might also be incorporated in the body of the tool as a permanent fixture(s). All such alternative means for employing a laser(s) on the measuring tool are contemplated by the inventor.

BRIEF SUMMARY OF THE INVENTION

It is an object of this invention to provide an easy to use tool to transfer angle readings from a work place surface(s) to a miter saw/miter box, to any other cutting device, or directly to any work piece, in a one-step operation.

It is a further object of this invention to measure and/or project with a laser, an angle, its complementary angle, its supplementary angle, common roof pitch angles and/or any angle interpretation to which the several scales might be adapted. In the preferred embodiment all of these angle interpretations are measured and projected simultaneously.

In the preferred embodiment of the invention an angle measurement tool is provided that in its final form is limited to two parts. Both of the parts have a plurality of scale measurements scribed upon them. The tool is so constructed that the movement of the two parts relative to each other will result in an angle being formed there between that will be measured by referring to a setting on the scales so provided.

The tool can be utilized to measure the miter joint angle, bevel and miter settings for compound angles, the actual angle made by the legs of the tool, the complementary angle of the actual angle, the supplementary angle of the actual angle, the common roof pitch angle and/or any angle interpretation to which the several scales might be adapted. In the preferred embodiment, all of these angle interpretations are measured simultaneously. The tool can also be utilized with its laser accessory (or integral laser[s]) to measure, layout and project wall angles, construction angles and any angle encountered or required. This improvement is accomplished by attaching the twin-beamed laser to the invention and projecting a line along a chosen angle from a known point to any other point along the laser beam. Said point, or points, along the projected laser beam must be located in order to achieve a proper rendition of the angle required, and the laser accessory achieves that purpose in a one-step operation. It should be understood by those practiced in the art that many additional deployments of lasers might be employed for a variety of angle projections that are calculated by the measuring tool. It should be further understood that said laser(s) might also be integrated into the measuring tool, in addition to, or as an alternative to the laser device.

BRIEF DESCRIPTION OF THE DRAWINGS

FIGS. 1A, 1B, and 1C are plan views of the dial 12.
FIGS. 2A, 2B, and 2C are plan views of top leg 14.
FIG. 2D is a 'reverse side' plan view of top leg 14.
FIGS. 3A, 3B, and 3C are plan views of the 0-ring 16.
FIGS. 4A, 4B, and 4C are plan views of bottom leg 18.
FIG. 5 is a plan view of bolt 20.
FIG. 9 is a side cut-away view of tool 10.
FIGS. 10A and 10B are exploded views of tool 10.
FIGS. 13A, 13B and 13C are plan views of the dial 12.
FIGS. 14A, 14B and 14C are plan views of bottom leg 18.
FIG. 15 is a side cut-away of tool 10.

FIGS. 16A and 16B are exploded views of tool 10.

FIGS. 17A, 17B and 17C are plan views of the dial 12.

FIGS. 18A, 18B and 18C are plan views of bottom leg 18.

FIG. 19 is a side cut-away of tool 10.

FIGS. 20A and 20B are exploded views of tool 10.

FIGS. 21A, 21B, 21C and 21D are plan views of the Laser Pointer Improvement 80.

FIG. 22 is a perspective view of the Laser Pointer Improvement 80.

FIGS. 23A, 23B and 23C are plan views of the mounting plate accessory 90 for the Laser Pointer Improvement 80.

FIG. 24 is a perspective view of the mounting plate accessory 90 for the Laser Pointer Improvement 80.

FIG. 25 illustrates the Compound Angle Conversion Table 110.

DETAILED DESCRIPTION OF THE INVENTION

Figure 6:
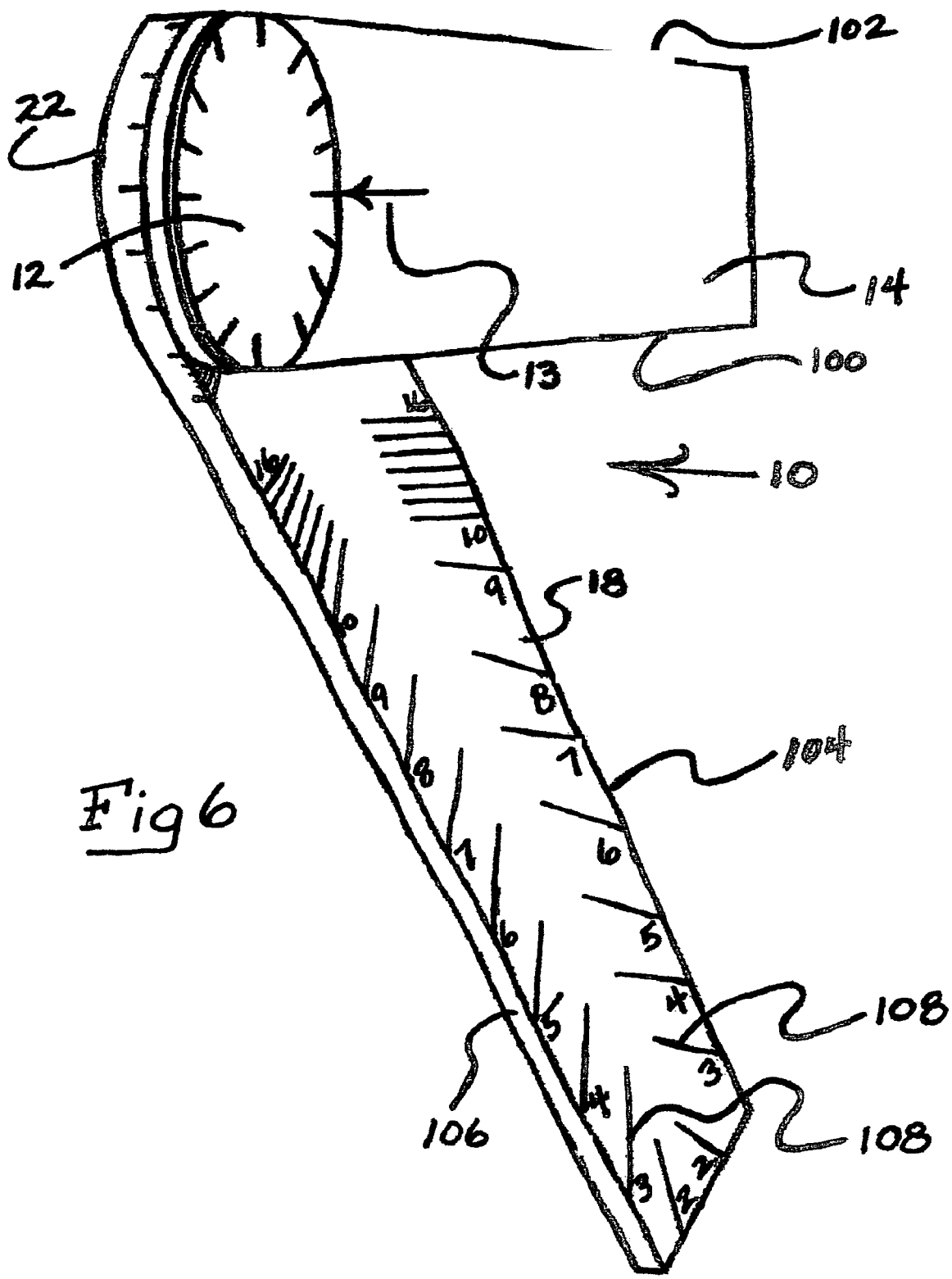
FIG. 6 is a perspective view of all of the components of tool 10 as assembled with the legs forming an acute angle.

As can be seen in the FIGS. 1-12 the preferred embodiment of angle measurement tool 10 is constructed from several components including dial 12, top leg 14, O-ring 16, bottom leg 18 and bolt 20. Legs 14 and 18 are the same width and both have a circular shaped end 22. It should be understood that circular end 22 of both leg 14 and leg 18 is a semicircle of a circle having a diameter equal to the width of leg 14 and leg 18. It should be further understood that leg 14 and leg 18 might be wider or narrower than circular end 22 where the legs extend beyond the circle described by end 22. It should also be understood that leg 14 and leg 18 might have non-parallel edges and tool 10 will still function as intended. Openings 24 and 26 in legs 14 and 18 respectively, are provided at the center of the circle of which ends 22 are a part. In the preferred embodiment, dial 12 is circular in shape and has a diameter equal to the width of legs 14 and 18 as shown in the drawings. It should be understood that dial 12 could have a diameter less than the width of legs 14 and 18 in order to facilitate placing indicia on that top surface of leg 14 which surrounds dial 12 and further, does not have to be in the shape of a circle in order for tool 10 to operate in the fashion described. As can be seen in FIGS. 4A, 4B and 4C both socket 28 and offset indexing socket 33 are recessed into leg 18 around the perimeter of hole 26 for reasons that will be apparent below. As can be seen in FIGS. 10A and 10b the components of tool 10 are assembled such that O-ring 16 is placed within the outer circumference of the recessed opening 30. Leg 14 is positioned over leg 18 so that the recessed opening 30 and O-ring 16 in leg 14 are concentric with opening 26 and socket 28 in leg 18. Bolt 20 is then used to tighten and compress O-ring 16 between leg 14 and leg 18. The presence of O-ring 16 provides a frictional force between legs 14 and 18 that maintains dial 12 in a steady position for an accurate reading of the measured angle. It should be understood that O-ring 16 might not be necessary in all applications. Other position adjustment mechanisms are contemplated in alternative embodiments of the invention. As can be seen in FIG. 4 leg 18 is provided with a positionally unique offset indexing socket 33 formed off the center of socket 28. In the preferred embodiment a circular projection 35 and off-center indexing peg 29 having the same shapes as offset indexing socket 33 and socket 28, respectively, are provided on the bottom surface of dial 12 as shown in FIG. 1 . When the components are assembled projection 35 and off-center indexing peg 29 fit snugly in socket 28 and offset indexing socket 33, respectively, so that dial 12 and leg 18 never move in relation to each other.

Figure 11:
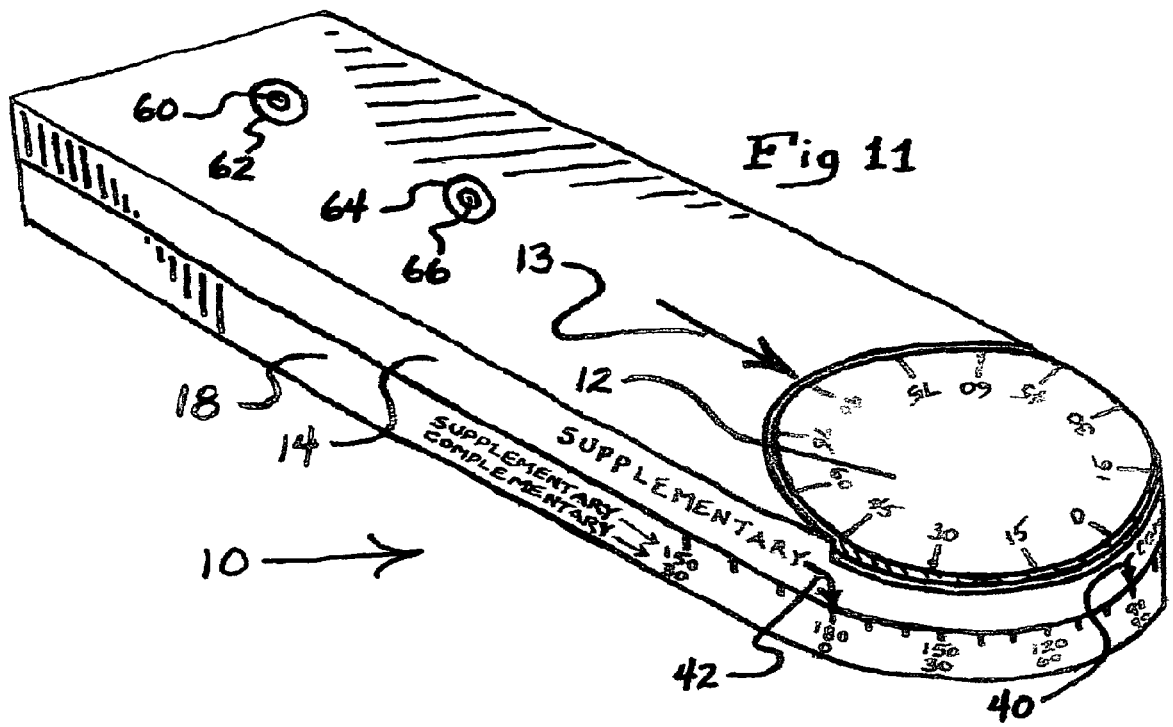
FIG. 11 is a perspective view of tool 10 in a closed position.
Figure 12:
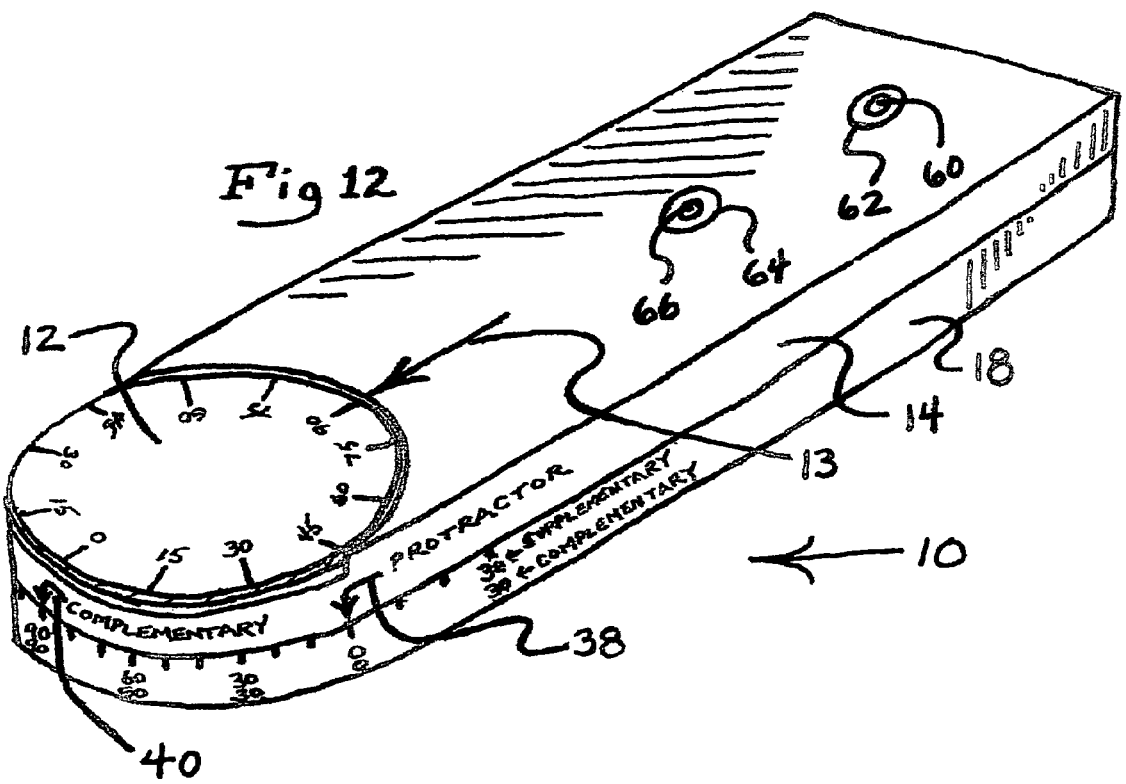
FIG. 12 is a perspective view of tool 10 in a closed position.

As can be seen in FIGS. 2A, 2B and 2C Leg 14 is also provided with a flat recess 36 on the top surface thereof which results in the top surface of dial 12 being coplanar with the top surface of leg 14 after the components of tool 10 are assembled. It should be understood that the top surface of dial 12 does not have to be co-planer with the top surface of leg 14. Countersunk flathead bolt 20 is passed through the bottom of leg 18 into locking, or non-locking, threads in the center of projection 35 on the bottom of dial 12 resulting in legs 14 and 18 compressing O-ring 16 in a sandwich-like manner. This provides precisely pivoting legs 14 and 18 with a friction adjustment. In the use of tool 10 no further friction adjustment is necessary. It is recognized that leg 14 is the only moving part of tool 10 when being used to measure an angle for a miter joint reading or any other angle reading to which tool 10 is adapted. Arrow 13 is provided on the top surface of leg 14 as shown in the figures. Arrows 38, 40 and 42 are provided on the radial surface of leg 14 as shown in FIGS. 11 and 12. In operation tool 10 simultaneously provides the miter joint angle measurement, the actual angle made by the legs 14 and 18, the complementary angle measurement of the actual angle and the supplementary angle measurement of the actual angle. In the preferred embodiment dial 12 is provided with indexing markings that are representative of the miter joint angle reading. Specifically arrow 13 points to the marking on dial 12 that is the miter joint reading. The indexing provided on the radial surface of leg 18 measures the actual angle reading via arrow 38; the complementary angle reading via arrow 40 and the supplementary angle reading via arrow 42. Referring to FIGS. 11 and 12 it is noted that the indexing markings representing the complementary angle readings are located on the bottom row of numbers printed on the radial surface of leg 18 and the supplementary angle readings are located on the top row of numbers. Alternative embodiments are contemplated by the inventor in which a wide variety of angle readings may be accomplished on the top surfaces, bottom surfaces and edges of either or both of legs 14 and 18, as well as on dial 12. FIGS. 17A, 17B, 17C, 18A, 18B, 18C, 19, 20A and 20B disclose an alternative embodiment in which leg 18 is provided with a positionally unique indexing socket 43 formed concentrically with socket 28. In the preferred embodiment a circular projection 35 and on-center positionally unique peg 41 have the same shapes as socket 28 and positionally unique indexing socket 43, respectively. Projection 35 and on-center positionally unique peg 41 are provided on the bottom surface of dial 12 as shown in the FIGS. 17A, 17B and 17C. When the components are assembled projection 35 and positionally unique on-center peg 41 fit snugly in socket 28 and positionally unique indexing socket 43, respectively, so that dial 12 and leg 18 never move in relation to each other.

FIGS. 13A, 13B, 13C, 14A, 14B, 14C, 15, 16A and 16B disclose an alternative embodiment in which leg 18 is provided with a positionally unique indexing socket 32 formed in the center of support 28. In this embodiment a positionally unique projection 34 having the same shape as positionally unique indexing socket 32 is provided on the bottom surface of dial 12 as shown in FIGS. 13A, 13B and 13C. When the components are assembled, positionally unique projection 34 fits snugly in positionally unique socket 32 so that dial 12 and leg 18 never move in relation to each other.

It should be understood by anyone practiced in the art that there are an infinite number of arrangements of interlocking "pegs", "sockets", "projections" and "supports" that will secure dial 12 and leg 18 together such that they never move in relation to each other. The inventor contemplates all of these embodiments, including 'snap-together' designs, in addition to those represented in the figures.

As can be seen in FIG. 6 the top surface of leg 18 is provided with indicia 108 permanently affixed (or etched, printed, engraved, etc.) that provide readings for the common roof pitch angles. In the preferred embodiment the common roof pitch angles are expressed in the conventional format of "Inches of Rise Per Linear Foot". For example, a '3 in 12' common roof pitch refers to the angle created by a 12" horizontal line and a 3" vertical line in which the 3" vertical line originates at either end of the 12" horizontal line. It is understood, by definition, that the horizontal and vertical lines are perpendicular to each other. The angle in question is contained within the triangle described by said 3" and 12" lines. The hypotenuse of said triangle, in combination with said 12" line, illustrates the angle of the aforementioned '3 in 12' common roof pitch. The indicia 108 is utilized by viewing and reading either of the edges 100 or 102 on leg 14 at the place where those edges 100 and 102 align with the indicia 108 on leg 18. Similarly, the bottom surface of leg 14 may have such an indicia 108 and it would then be viewed and read by either of the edges 104 or 106 on leg 18. It should be understood that said form of indicia 108 is not intended to be limited to the reading of common roof pitches. It is the inventor's intention that said form of indicia 108 might be used for any of the angle readings mentioned on these pages as well as any angle reading that such indicia 108 can be adapted to. It should be further understood that the common roof pitch angles can be placed on any of the dials, surfaces or edges of the invention where said dials, surfaces and edges interplay in such a way as to provide a relationship between the parts that enables a consistent and predictable angle reading that can be scaled and read. It should be further understood that any number of different scales can be deployed on any of the dials, surfaces or edges of the invention, throughout an infinite number of conceivable angle layouts. The inventor contemplates all such variations of the layout of the scales and indicia.

Figure 7:
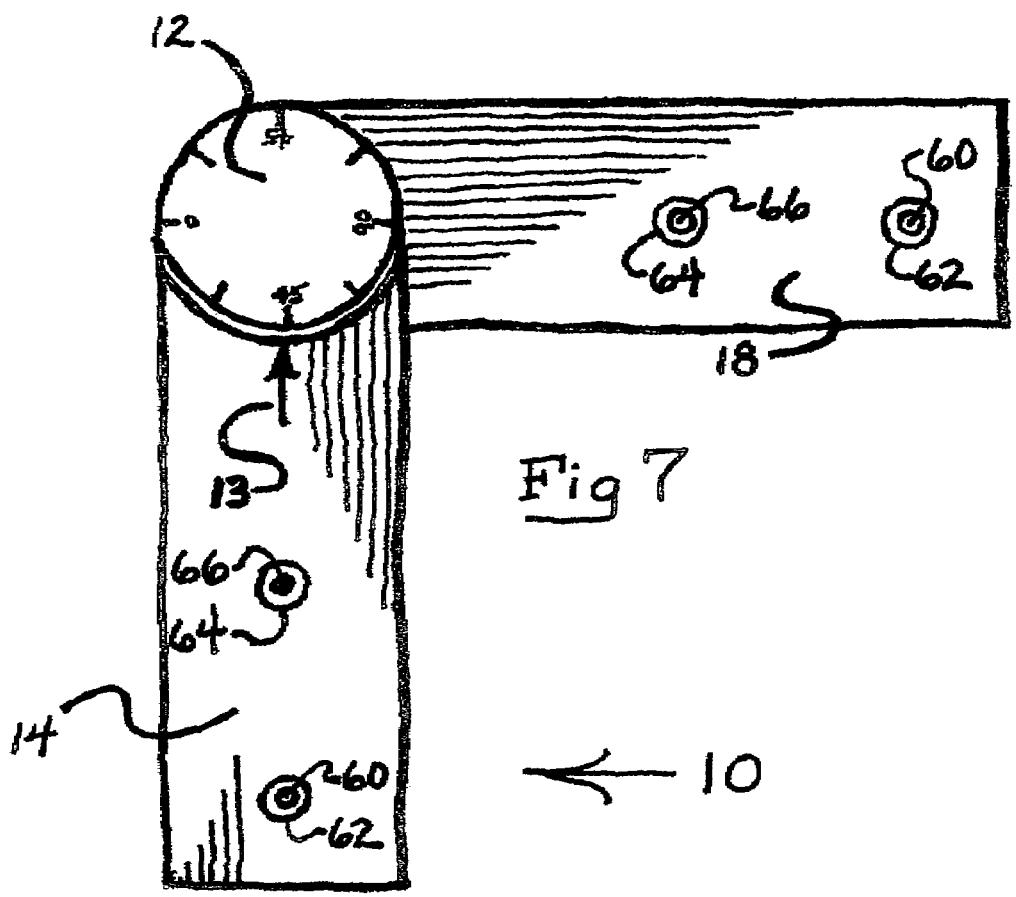
FIG. 7 is a top view of tool 10.
Figure 8:
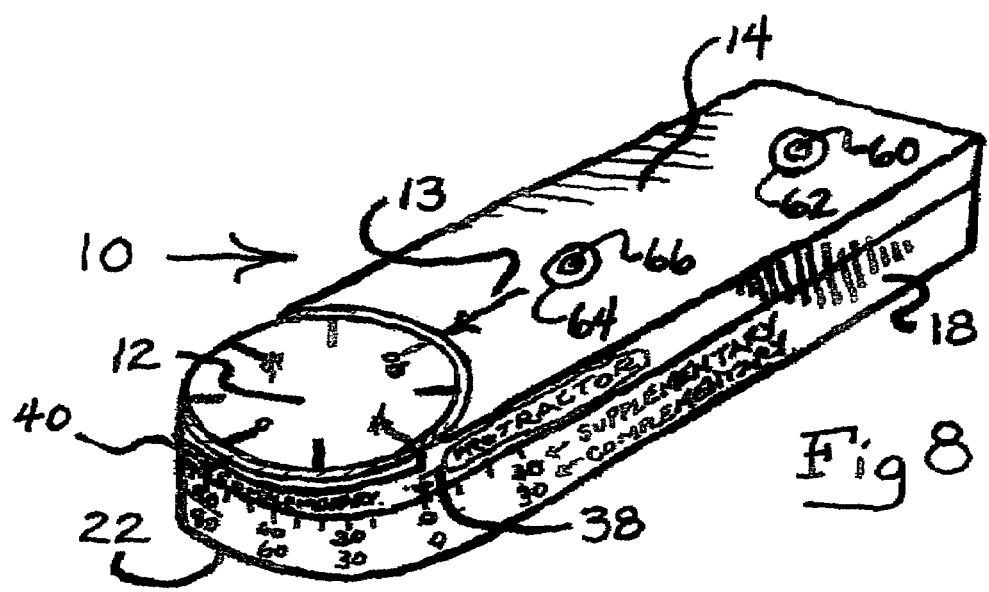
FIG. 8 is a perspective view of tool 10 in a closed position.

As can be seen in FIG. 7, leg 18 is provided with two inserts 62 and 64 permanently fixed on a line parallel to the leg 18 side of the angle made by the legs 14 and 18. In the preferred embodiment inserts 62 and 64 are flush with the bottom surface of leg 18. Inserts 62 and 64 are entirely contained between the bottom and top surfaces of leg 18. Inserts 62 and 64 house locating holes 60 and 66 for reasons that will be apparent below. Inserts 62 and 64 may be similarly placed in leg 14, as shown in FIGS. 7 and 8. In the preferred embodiment inserts 62 and 64 are steel, either magnetized or not magnetized. It should be understood that inserts 62 and 64 provide holes 60 and 66 that are perpendicular to the bottom surface of leg 18 and/or the top surface of leg 14. Inserts 62 and 64 pass through either or both legs 14 and 18 such that the function of inserts 62 and 64 and holes 60 and 66 is identical from either the top or bottom surfaces of leg 18 and/or leg 14. It should be further understood that inserts 62 and 64 might be made of materials other than steel. It should be further understood that inserts 62 and 64 can be substituted for by holes 60 and 66 passing directly through the material of leg 18 and/or leg 14. It should be further understood that inserts 62 and 64 and holes 60 and 66 may not necessarily pass entirely through leg 18 and/or leg 14 and thus it is possible to place inserts 62 and 64 and likewise holes 60 and 66 on either or both of the top and bottom surfaces of either or both of legs 14 and 18. Holes 60 and 66 may be of the same shape as each other or they may be unique shapes. FIGS. 21A, 21B, 21C, 21D and 22 illustrate laser device 80 for projecting diametrically opposed laser beams 84 and 86 in diametrically opposite directions from each other. Laser device 80 is fitted with two pegs 68 and 70 that precisely match the shape or shapes of holes 60 and 66. Pegs 68 and 70 may be of the same shape as each other or they may be unique shapes. Pegs 68 and 70 are fit perpendicular to the bottom surface 88 of laser device 80. Bottom surface 88 is in a single plane. Bottom surface 88 is parallel with laser beams 84 and 86. The distance between the center of pegs 68 and 70 is exactly the same distance that is between the center of holes 60 and 66. Laser beams 84 and 86 are in a line parallel to the line passing through the center of pegs 68 and 70 where pegs 68 and 70 penetrate bottom surface 88. In the preferred embodiment pegs 68 and 70 are circular and made of steel, either magnetized or not magnetized. It should be understood that other shapes and materials are contemplated for pegs 68 and 70. It should also be understood that magnetic attachment is one of many means contemplated for attaching laser device 80 to leg 18 and/or leg 14. Battery compartment 82 is provided to contain batteries for energizing laser beams 84 and 86. Laser beams 84 and 86 may be generated from a single source and redirected on diametrically opposite paths. Laser beams 84 and 86 may also be generated separately. Laser beams 84 and 86 may be generated not only as single lines, but might also be projected as planes or any number of planes.

In operation laser device 80 is affixed to tool 10 by placing pegs 68 and 70 in holes 60 and 66. It should be recognized by those practiced in the art that various other means of attaching laser device 80 to tool 10 are possible and those ways are contemplated by the inventor. Laser beams 84 and 86 are employed to project an angle. In the preferred embodiment, the union of tool 10 and laser device 80 projects laser beams 84 and 86 along one side of the angle made by the legs 14 and 18. The other side of the angle made by the legs 14 and 18 represents the base line from which the particular angle is being calculated and projected. Whichever of the legs 14 and 18 that does not have the laser device 80 mounted on it is the leg that is set parallel to the base line. Either laser beam 84 or laser beam 86 point in the direction of, or parallel to, the axis of legs 14 and 18. Laser beams 84 and 86 are by design always parallel to one side of the angle being measured and projected. Laser beams 84 or 86 may pass over, across or beside the axis of legs 14 and 18. Laser beam 84 or 86 is aimed at the spring point of the angle that is to be projected. The opposite laser beam (either 84 or 86), the one not aimed at the spring point of the angle, projects the chosen angle along and beyond the angle made by the legs 14 and 18. It should be understood by those practiced in the art that there are alternative embodiments for a laser, or lasers, in which the laser function(s) are an integral part of tool 10 in addition to laser device 80, or in place of laser device 80. All such alternative embodiments are contemplated by the inventor.

FIGS. 23A, 23B, 23C and 24 illustrate a mounting plate 90 which is provided for employing the laser device 80 independently from tool 10. Mounting plate 90 has coplanar top 94 and bottom 92 surfaces. Mounting plate 90 includes inserts 62 and 64 with holes 60 and 66 placed in the exact same relation as they are on leg 18 and/or leg 14. It should be further understood that inserts 62 and 64 can be substituted for by holes 60 and 66 passing directly through the material of mounting plate 90. In operation mounting plate 90 provides a smooth and flat surface 92 beneath bottom surface 88. Mounting plate 90 is sufficiently thick to house pegs 68 and 70 such that they do not interfere with the use of laser device 80 on any flat surface.

Referring to FIG. 2D it can be seen that the bottom surface of leg 14 is also provided with a permanently affixed (or etched, printed, engraved, etc.) indicia 58 radiating throughout 360 degrees from the center of the circle of which ends 22 are a part. In the preferred embodiment indicia 58 is circular in shape and has a diameter equal to the width of legs 14 and 18 as shown in the drawings. It should be understood that indicia 58 could have a diameter less than the width of legs 14 and 18 within the circle described by end 22, and further, does not have to be in the shape of a circle in order for tool 10 to operate in the fashion described. As can be seen in FIGS. 4A, 4B, 4C, 14A, 14B, 14C, 18A, 18B and 18C leg 18 is provided with 'opening' 50 through which indicia 58 can be viewed. 'Opening' 50 can be any shape (notches, holes, bevels, etc.) that permits viewing any portion of indicia 58. Multiple 'openings' similar to 50 may be employed simultaneously. In the preferred embodiment pointer/arrow 52 and pointer/arrow 54 are provided on surface 56. In the preferred embodiment, indicia 58 is arranged to indicate the actual angle created between the two legs 14 and 18 at any moment throughout a three hundred sixty degree revolution relative to each other. For example, in the preferred embodiment, either of the two scales on indicia 58 will indicate ninety degrees when legs 14 and 18 are rotated to a position in which they are at a right angle to each other. For further example, in the preferred embodiment legs 14 and 18 will indicate the actual angle on indicia 58 on the two scales originating at zero degrees and one hundred eighty degrees, respectively, when tool 10 is in the closed position, wherein legs 14 and 18 are perfectly mated face to face. One of the scales on indicia 58 will thus range from zero degrees through to one hundred eighty degrees and back to zero degrees as it travels through a full three hundred sixty degree revolution. The other scale on indicia 58 will range, conversely, from one hundred eighty degrees through to zero degrees and back to one hundred eighty degrees as it travels through a full three hundred sixty degree revolution. In this embodiment of indicia 58 the two scales provide indication of the actual angle in both of the two possible interpretations of the actual angles created by the interrelation of legs 14 and 18. In the preferred embodiment indicia 58 provides two scales that simultaneously indicate the actual angle and its complement throughout both halves of a full three hundred sixty degree revolution of legs 14 and 18 in relation to each other. In operation this feature provides additional means on tool 10 for the reading of angles. The layout of indicia 58 can be altered to employ any interpretation of the angles created by the movement of legs 14 and 18 in relation to each other, and the inventor contemplates each alternative layout of indicia 58.

FIG. 25 illustrates the table 110 that is used to convert the miter joint reading, indicated on dial 12 by arrow 13, into the miter and bevel cuts required to execute a compound cut. This is accomplished simply by reading the miter cut table 110 horizontally across from the indicated miter joint reading in the miter cut column 112 to ascertain the appropriate miter and bevel cuts required for either of the two standard crown moulding pitch angles as shown in column 114 and column 116. Additional embodiments of the table should be obvious to those skilled in the art. The inventor contemplates all such additional embodiments of the table. Multiple tables may also be employed. Table 110, as well as those additional tables contemplated, is/are to be placed anywhere on the surfaces of leg 14 and/or leg 18 that will suitably accommodate them.

Although specific embodiments of the invention have been described it should be recognized that additional modification and other alternative embodiments may be apparent to those skilled in the art.

The invention claimed is:

1. An angle measuring tool comprising: a first leg having a recessed portion being pivotally connected to a second leg having a recessed portion, angle measurement means having a top side and a bottom side, said angle measurement means positioned in said recessed portion of said first leg so that the surface of said top side is co-planar with the top surface of said first leg and a portion of said bottom side extends through an opening in said recessed portion of said first leg, said portion of said bottom side having a circular shaped projection, said circular shaped projection of said portion of said bottom side being provided with a concentrically positioned non-circular shaped second projection extending from said circular shaped projection wherein said circular shaped projection and said non-circular shaped second projection are concentrically positioned with respect to each other and said portion of said bottom side which then fits into said recessed portion of said second leg so that said angle measurement means is locked into said second leg for movement together and wherein the angle formed by said first and second legs is readable on any surface of said first or second legs or said angle measurement means.

2. The angle measurement tool of claim 1 wherein said first and second legs each have at least one straight edge.

3. The angle measurement tool of claim 2 wherein said top surface of said top side of said angle measurement means is circular in shape.

4. The angle measurement tool of claim 1 wherein said top surface of said top side of said angle measurement means is circular in shape.

5. The angle measurement tool of claim 1 wherein actual angles, miter joint angles, complementary angles, and supplementary angles can be read simultaneously from indicia on the tool.

* * * * *